United States Patent
Ji et al.

(10) Patent No.: US 7,941,155 B2
(45) Date of Patent: May 10, 2011

(54) CALCULATION AND BROADCAST OF CELL-LOAD RATIO AND INTELLIGENT CELL SELECTION FOR IEEE802.16M

(75) Inventors: Baowei Ji, Plano, TX (US); Changhoi Koo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 439 days.

(21) Appl. No.: 12/230,106

(22) Filed: Aug. 22, 2008

(65) Prior Publication Data
US 2009/0137251 A1    May 28, 2009

Related U.S. Application Data

(60) Provisional application No. 60/996,620, filed on Nov. 27, 2007.

(51) Int. Cl.
*H04W 72/00*    (2009.01)
(52) U.S. Cl. ..... 455/453; 455/437; 455/561; 455/422.1; 455/3.01
(58) Field of Classification Search .......... 455/453, 455/436–439, 561, 562.1, 422.1
See application file for complete search history.

(56) References Cited

U.S. PATENT DOCUMENTS

| 7,747,783 B2 * | 6/2010 | Morvan et al. ............... 709/248 |
| 2005/0101326 A1 | 5/2005 | Kang et al. |
| 2005/0117539 A1 * | 6/2005 | Song et al. .................... 370/328 |
| 2008/0247375 A1 * | 10/2008 | Muharemovic et al. ...... 370/344 |

FOREIGN PATENT DOCUMENTS
KR    1020060097506 A    9/2006

OTHER PUBLICATIONS

International Search Report dated Jun. 29, 2009 in connection with PCT Application No. PCT/KR2008/006837.

* cited by examiner

*Primary Examiner* — Huy Phan
*Assistant Examiner* — Chuong A Ngo

(57) ABSTRACT

A method for data transmission, contemplates calculating a cell-load ratio by:

$$r_{cl,n} = (1-\alpha) \cdot r_{cl,n-1} + \frac{d_n}{S_n},$$

where $r_{cl,n-1}$ is a cell-load ratio calculated in a previous stage, $r_{cl,n}$ is an instant cell-load ratio, $\alpha$ is a forgetting factor, $d_n$ is an instantaneous cell load, and $S_n$ is a frame capacity; and broadcasting the calculated cell-load ratio by carrying the cell-load ratio in a designated message.
Methods of a cell selection and a handover for a subscriber which are initiated by a subscriber are in dependence upon both of the cell-load ratio and the signal strength provided by the base stations.

34 Claims, 6 Drawing Sheets

CALCULATION AND BROADCAST OF CELL-LOAD RATIO AND INTELLIGENT CELL SELECTION FOR IEEE802.16M

CLAIM OF PRIORITY

This application makes reference to, incorporates the same herein, and claims all benefits accruing under 35 U.S.C. §119 from an application earlier filed in the U.S. Patent & Trademark Office on 27 Nov. 2007 and there duly assigned Ser. No. 60/996,620.

BACKGROUND OF THE INVENTION

1. Field of the Invention

The present invention relates to methods and apparatuses for data transmission, and more specifically, to methods for calculating and broadcasting cell-load ratio information, and methods for a cell selection and a handover initiated by a subscriber based on the cell-load ratio information and signal strength of base stations and apparatuses performing these methods.

2. Description of the Related Art

IEEE Standards 802.16-2005 (also known as IEEE802.16e and mobile WiMAX) "provide enhancements to IEEE Standards 802.16-2004 to support subscriber stations moving at vehicular speeds and thereby specify a combined system for fixed and mobile broadband wireless access." In IEEE Standards 802.16-2005, "functions to support higher layer handover between base stations or sectors are specified."

IEEE Standards 802.16-2005 however, do not disclose cell-load information in any base station (BS) broadcast message, such as DL-MAP (Downlink Access Definition) message, UL-MAP (Uplink Access Definition) message, DCD (Downlink Channel Descriptor) message, UCD (Uplink Channel Descriptor) message, MOB-NBR-ADV message (neighbor advertisement message), etc. In the contemporary wireless data transmission system constructed as IEEE Standards 802.16-2005, a contemporary mobile station (MS) does not consider the cell load of a target base station (BS) during the selection of a designated cell in the initialization stage or in the handover stage; and a serving BS does not consider the cell load of the neighboring BSs during performing a handover of the MS to one of those neighboring BSs. The handover process is a process in which an MS migrates from the air-interface provided by one BS to the air-interface provided by another BS.

The absence of cell-load information in IEEE Standards 802.16-2005 may introduce several problems, such as the call interruption during the handover process, the low throughput, the long delay and jitter, the high rate of call drop, and thus deteriorating the QoS (quality of service) of the transmission system.

Looking beyond contemporary IEEE Standard 802.16e, i.e., the mobile WiMAX technology, the IEEE is constructing IEEE Standards 802.16m for the gigabit WiMAX technology and IEEE Standards 802.16m may be possibly merged with LTE (long term evolution).

It is therefore necessary for standards IEEE802.16m to employ the cell-load information for data transmission in LTE, LTE+ (long term evolution plus), 4G (fourth generation) and 4G beyond systems in order to improve the quality of service of these systems.

SUMMARY OF THE INVENTION

It is therefore an object of the present invention to provide methods for calculating and broadcasting cell-load ratio information and apparatuses performing these methods in order to improve the quality of service for the data transmission in LTE, LTE+, 4G and 4G beyond systems.

It is another object of the present invention to provide an improved method and an apparatus for the cell selection and the handover for a subscriber in order to improve the quality of service of the transmission system.

It is still another object of the present invention to provide methods for incorporating the cell-load radio to the contemporary IEEE Standards 802.16-2005 and thus implanting the cell-load radio into the IEEE Standards 802.16m which is currently under development.

In the first embodiment of the present invention, a method for data transmission, contemplates calculating an instant cell-load ratio by:

$$r_{cl,n} = (1-\alpha) \cdot r_{cl,n-1} + \frac{d_n}{S_n},$$

where $r_{cl,n-1}$ is a cell-load ratio calculated in a previous stage, $r_{cl,n}$ is the instant cell-load ratio, $\alpha$ is a forgetting factor, $d_n$ is an instantaneous cell load, and $S_n$ is a frame capacity; and broadcasting the calculated cell-load ratio by carrying the cell-load ratio in a designated message. Here, $\alpha$ may be the reciprocal of an equivalent averaging period in a number of orthogonal frequency-division multiplexing (OFDM) frames for an exponential smoothing filter. $\alpha$ may be the reciprocal of an equivalent averaging period in a number of transmission time intervals (TTIs) for the long term evolution (LTE) for an exponential smoothing filter.

Preferably, the designated message may be a downlink channel descriptor (DCD) message. A format of the DCD message may be:

| Syntax | Size | Notes |
|---|---|---|
| DCD_Message_Fromat( ) { | | |
|     Management Message Type = 1 | 8 bits | |
|     Cell-Load Ratio | 3 bits | Indication of cell-load ratio (see Table 3) |
|     Reserved | 5 bits | Shall be set to zero |
|     Configuration Change Count | 8 bits | TLV specific |
|     TLV Encoded information for the overall channel | Variable | TLV specific |
|     Begin PHY Specific Section { | | See applicable PHY subclause |
|         for (I = 1; I <= n; I ++) { | | For each downlink burst profile 1 to n |
|             Downlink_Burst_Profile | | PHY specific |
|         } | | |
|     } | | |
| } | | |

, where the indicator of the three-bit cell-load ratio represents a corresponding value of the cell-load ratio.

Preferably, the relationship between the indicator value of the cell-load ratio and the corresponding cell-load ratios may satisfy:

| Indicator Value | Cell-Load Ratio |
|---|---|
| 000 | <30% |
| 001 | <40% |
| 010 | <50% |
| 011 | <60% |
| 100 | <70% |
| 101 | <80% |
| 110 | <90% |
| 111 | Reserved |

Preferably, one of encodings of the DCD message represents the cell-load ratio information and the one of encodings of the DCD message satisfies:

| Name | Type (1 byte) | Length | Value (variable length) | PHY scope |
|---|---|---|---|---|
| Cell-Load Ratio | 61 | 1 | 0x00 < 30% <br> 0x01 < 40% <br> 0x02 < 50% <br> 0x03 < 60% <br> 0x04 < 70% <br> 0x05 < 80% <br> 0x06 < 90% <br> 0x07-0xff Reserved | OFDMA |

Preferably, the DCD is one of encodings of a MOB-NBR-ADV message (neighbor advertisement message), and a neighbor base station trigger type/length/value (TLV) of the MOB-NBR-ADV message satisfies:

| Name | Type | Length (1 byte) | Value |
|---|---|---|---|
| Signal - Type/function/action | 4.1 | 1 | Refer Table A |
| Cell Load - Type/function/action | 4.4 | 1 | Refer Table B |
| Trigger value | 4.2 | 1 | Trigger value is the value used in comparing measured metric for determining a trigger condition. |
| Trigger averaging duration | 4.3 | 1 | Trigger averaging duration is the time in ms over which the metric measurements are averaged. When the mean value of the measurement meets the trigger condition, the MS reacts using the specified action. | where Table A is:

| Name | Length (1 byte) | Value |
|---|---|---|
| Type | 2 bits (MSB) | Trigger metric type: <br> 0x0: CINR metric <br> 0x1: RSSI metric <br> 0x2: RTD metric <br> 0x3: Reserved |
| Function | 3 bits | Computation defining trigger condition: <br> 0x0: Reserved <br> 0x1: Metric of neighbor BS is greater than absolute value <br> 0x2: Metric of neighbor BS is less than absolute value <br> 0x3: Metric of neighbor BS is greater than serving BS metric by relative value <br> 0x4: Metric of neighbor BS is less than serving BS metric by relative value <br> 0x5-0x7: Reserved |
| Action | 3 bits (LSB) | Action performed upon reaching trigger condition: <br> 0x0: Reserved <br> 0x1: Respond on trigger with MOB_SCN-REP <br> 0x2: Respond on trigger with MOB_MSHO-REQ <br> 0x3-0x7: Reserved, | and Table B is:

| Name | Length (1 byte) | Value |
|---|---|---|
| Type | 2 bits (MSB) | Trigger metric type: <br> 0x0: Cell-Load Ratio <br> 0x1-0x3: Reserved |
| Function | 4 bits | Computation defining trigger condition: <br> 0x0: Reserved <br> 0x1: Metric of neighbor BS is greater than absolute value <br> 0x2: Metric of neighbor BS is less than absolute value <br> 0x3: Metric of neighbor BS is greater than serving BS metric by relative value <br> 0x4: Metric of neighbor BS is less than serving BS metric by relative value <br> 0x5-0x7: Reserved |
| Action | 3 bits (LSB) | Action performed upon reaching trigger condition: <br> 0x0: Reserved <br> 0x1: Respond on trigger with MOB_SCN-REP <br> 0x2: Respond on trigger with MOB_MSHO-REQ <br> 0x3-0x7: Reserved |

Preferably, the base station may transmit a base station handover request (MOB_BSHO-REQ) message with the MOB_BSHO-REQ message including information representing the cell-load ratio. Here, the MOB_BSHO-REQ message includes contents of:

| Syntax | Size | Notes |
|---|---|---|
| ... <br> If(Mode ==0b000){ <br> ... <br>   For(j=0; j<N_Recommended; j++){ <br>     ... <br>     Service level prediction <br>     Cell_Load_Ratio | <br><br><br><br><br>3 bits <br>3 bits | <br><br><br><br><br><br>000 < 30% <br>001 < 40% <br>010 < 50% |

-continued

| Syntax | Size | Notes |
|---|---|---|
| | | 011 < 60% |
| | | 100 < 70% |
| | | 101 < 80% |
| | | 110 < 90% |
| | | 111 Reserved |
| ... | | |

Preferably, the base station may transmit a mobile station handover request (MOB_MSHO-REQ) message with the MOB_BSHO-REQ message including information representing the cell-load ratio. The MOB_MSHO-REQ message includes contents of:

| Syntax | Size | Notes |
|---|---|---|
| ... | | |
| For(j=0; j<N_New_BS_Index; j++){ | | |
| ... | | |
| Service level prediction | 3 bits | |
| Cell_Load_Ratio | 3 bits | 000 < 30% |
| | | 001 < 40% |
| | | 010 < 50% |
| | | 011 < 60% |
| | | 100 < 70% |
| | | 101 < 80% |
| | | 110 < 90% |
| | | 111 Reserved |
| ... | | |

Preferably, the base station may transmit a base station handover response (MOB_BSHO-RSP) message with the MOB_BSHO-RSP message including information representing the cell-load ratio. The MOB_BSHO-RSP message includes contents of:

| Syntax | Size | Notes |
|---|---|---|
| ... | | |
| If(Mode ==0b000){ | | |
| ... | | |
| For(j=0; j<N_Recommended; j++){ | | |
| ... | | |
| Cell_Load_Ratio | 3 bits | 000 < 30% |
| | | 001 < 40% |
| | | 010 < 50% |
| | | 011 < 60% |
| | | 100 < 70% |
| | | 101 < 80% |
| | | 110 < 90% |
| | | 111 Reserved |
| ... | | |

In another embodiment of the present invention, a method for data transmission, contemplates receiving broadcasted messages including information of a cell-load ratio established by:

$$r_{cl,n} = (1-\alpha) \cdot r_{cl,n-1} + \frac{d_n}{S_n},$$

where $r_{cl,n-1}$ is a value of the cell-load ratio calculated in a previous stage, $r_{cl,n}$ is the instant cell-load ratio, $\alpha$ is a forgetting factor, $d_n$ is an instantaneous cell load, and $S_n$ is a frame capacity; monitoring, at the subscriber, signal strength of a plurality of base stations; and when the subscriber is powered on, selecting, among the plurality of base stations, a base station having the cell-load ratio lower than a first predetermined threshold and the signal strength higher than a second predetermined threshold as a serving base station for the subscriber.

Preferably, the broadcasted messages are downlink channel descriptor (DCD) messages.

Preferably, the subscriber exacts the cell-load ratio information from the received DCD messages.

Preferably, the first predetermined threshold is 60%.

When the subscriber is being in service by a designated base station, the method further contemplates when the cell-load ratio of the designated base station is greater than a third predetermined threshold and a difference of the cell-load ratio between the designate base station and at least one of neighboring base stations is equal to or greater than a fourth predetermined threshold, with the at least one of neighboring base stations having the signal strength higher than the second predetermined threshold, triggering an initiation of a handover; and selecting among the plurality of base stations the at least one of neighboring base stations as the serving base station for the subscriber.

When the subscriber is being in service by a designated base station, the method further contemplates respectively sending handover requests to the designated base station and to the selected serving base station; and performing handover negotiation between the designated base station and the selected serving base station.

Preferably, the third predetermined threshold is 75%.

Preferably, the fourth predetermined threshold is 15%.

Preferably, the method further includes a step of classifying the plurality of base stations into three groups with the three groups being: a first group including base stations providing signal strength lower than the first predetermined threshold, a second group including base stations providing signal strength higher than the first predetermined threshold and cell-load ratio higher than the predetermined second threshold, and a third group including base stations providing signal strength higher than the first predetermined threshold and cell-load ratio lower than the second predetermined threshold.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention provides a systematic mechanism for calculating and broadcasting the cell-load ratio, and a method for intelligent cell selection. Different embodiments will be discussed separately in the following description.

The Calculation of Cell-Load Ratio

Cell-load ratio is defined as a ratio of an average load of a cell to the capacity of the cell. In the present invention, the cell-load ratio may be calculated by equation (1):

$$r_{cl,n} = (1 - \alpha)r_{cl,n-1} + d_n/S_n, \quad (1)$$

where $r_{cl,n-1}$ is the previous value of the cell-load ratio, $r_{cl,n}$ is the instant cell-load ratio, $\alpha$ is the forgetting factor. Here, $\alpha^{-1}$ equals the equivalent averaging period in a number of orthogonal frequency-division multiplexing (OFDM) frames (or transmission time intervals (TTIs) for the LTE) for the exponential smoothing filter. Parameters $d_n$ and $S_n$, are the instantaneous cell load and frame capacity respectively. Parameters $d_n$ and $S_n$ are quantified as the number of the minimum scheduling units in an orthogonal frequency-division multiple access (OFDMA) system, e.g., one OFDMA slot by one sub-channel.

Here, the frame capacity is not expected to change during the normal operation. In other words, the value of $S_n$ remains constant for most cases. $S_n$ may change, however, in rare cases where a different frame length, a different frame structure and other related elements are used.

As applied in the present invention, the cell-load ratio is calculated by each base station (BS). The cell-load ratio may be separately calculated for downlink (DL) and uplink (UL) if desired, especially for frequency division duplex (FDD) case. For time division duplex (TDD) case, it is recommended to calculate the cell-load ratio as the ratio of a sum of DL traffic and UL traffic to the frame capacity.

The Broadcast of Cell-Load Ratio

The present invention does not preclude broadcasting the cell-load ratio information in the superframe control header (SCH), the frame control header (FCH), DL-MAP (Downlink Access Definition) message, UL-MAP (Uplink Access Definition) message, DCD (Downlink Channel Descriptor) message, UCD (Uplink Channel Descriptor) message, or any other messages. It is recommended however, to broadcast the cell-load ratio information in DCD messages for the tradeoff of signaling overhead and effective usage. It may incur too much overhead if broadcasting the cell-load ratio information in each frame by SCH, FCH, DL-MAP or UL-MAP messages. There is no essential difference for broadcasting the cell-load ratio information in DCD or UCD message, therefore, the present invention preferably includes the cell-load ratio information as a part of the DCD message for the purpose of standardization.

Table 1 shows the DCD message format as defined in IEEE Standards 802.16-2005. Table 1 is cited from section 6.3.2.3.1 of IEEE Standards 802.16-2005 and is identical to Table 15 of IEEE Standards 802.16-2005.

TABLE 1

Contemporary DCD Message Format

| Syntax | Size | Notes |
|---|---|---|
| DCD_Message_Fromat( ) { | | |
|   Management Message Type = 1 | 8 bits | |
|   Reserved | 8 bits | Shall be set to zero |
|   Configuration Change Count | 8 bits | TLV specific |
|   TLV Encoded information for the overall channel | Variable | TLV specific |
|   Begin PHY Specific Section { | | See applicable PHY subclause |
|     for (i = 1; i <= n; i ++) { | | For each downlink burst profile 1 to n |
|       Downlink_Burst_Profile | | PHY specific |
|     } | | |
|   } | | |
| } | | |

Here, three bits (3 bits) are dedicated for the indicator of the cell-load ratio, and the DCD message format may be redefined as shown in Table 2. The difference between Table 1 and Table 2 is that Table 2 has use three of the eight reserved bits for indicating cell-load ratio. Here, more bits may be used for defining the Cell-Load ratio in the DCD message.

TABLE 2

Modified DCD Message Format with Cell-Load Ratio Information

| Syntax | Size | Notes |
|---|---|---|
| DCD_Message_Fromat( ) { | | |
|   Management Message Type = 1 | 8 bits | |
|   Cell-Load Ratio | 3 bits | Indication of cell-load ratio (see Table 3) |
|   Reserved | 5 bits | Shall be set to zero |
|   Configuration Change Count | 8 bits | TLV specific |
|   TLV Encoded information for the overall channel | Variable | TLV specific |
|   Begin PHY Specific Section { | | See applicable PHY subclause |
|     for (i = 1; i <= n; i ++) { | | For each downlink burst profile 1 to n |
|       Downlink_Burst_Profile | | PHY specific |

TABLE 2-continued

Modified DCD Message Format with Cell-Load Ratio Information

| Syntax | Size | Notes |
|---|---|---|
|     } | | |
|   } | | |
| } | | |

Table 3 is an example of the specific value of each combination of the three bits defining cell-load ratio. Here, the specific value of each combination of the three bits defining cell-load ratio may be defined differently.

TABLE 3

Traffic-load Indicator

| Indicator Value | Cell-Load Ratio |
|---|---|
| 000 | <30% |
| 001 | <40% |
| 010 | <50% |
| 011 | <60% |
| 100 | <70% |
| 101 | <80% |
| 110 | <90% |
| 111 | Reserved |

Alternatively, one may use the same DCD message format as Table 3, and insert one entry to Table 358 (DCD channel encoding) of IEEE Standards 802.16-2005. Table 358 of IEEE Standards 802.16-2005 shows the contemporary DCD channel encodings. An entry representing the cell-load ratio as shown in Table 4 may be added into the contemporary DCD channel encodings. In this case, the standard shall mandate the broadcast of this entry in each DCD channel. Note that the type value could be defined as other value if proper. Similarly, the value of three bits representing the cell-load ratio may be defined differently if desired.

TABLE 4

Entity inserted to Table 358 in IEEE802.16-2005

| Name | Type (1 byte) | Length | Value (variable length) | PHY scope |
|---|---|---|---|---|
| Cell-Load Ratio | 61 | 1 | 0x00 < 30%<br>0x01 < 40%<br>0x02 < 50%<br>0x03 < 60%<br>0x04 < 70%<br>0x05 < 80%<br>0x06 < 90%<br>0x07-0xff Reserved | OFDMA |

Note that, the present invention has automatically included cell-load ratio information in MOB-NBR-ADV message because DCD is a part of the MOB-NBR-ADV encodings as shown in Table 348e cited from Section 11.1.7 (titled as "MOB-NBR-ADV Message Encoding") of IEEE Standards 802.16-2005. The following Section 11.1.7 including Tables 348e, 348f and 348g are cited from IEEE Standards 802.16-2005.

11.1.7 MOB-NBR-ADV Message Encodings

TABLE 348e

MOB-NBR-ADV encodings

| Name | Type (1 byte) | Length (1 byte) | Value (variable-length) |
|---|---|---|---|
| DCD_settings | 1 | variable | The DCD_settings is a compound TLV value that encapsulates a DCD message that may be transmitted in the advertised BS downlink channel. This information is intended to enable fast synchronization of the MS with the advertised BS downlink. The DCD settings fields shall contain only neighbor's DCD TLV values that are different from the serving BS corresponding values. For values that are not included, the MS shall assume they are identical to the serving BSs corresponding values. |
| UCD_settings | 2 | variable | The UCD_settings is a compound TLV value that encapsulates a UCD message that may be transmitted in the advertised BS downlink channel. This information is intended to enable fast synchronization of the MS with the advertised BS uplink. The UCD settings fields shall contain only neighbor's UCD TLV values that are different from the serving BS's corresponding values. For values that are not included, the MS shall assume they are identical to the serving BS's corresponding values. |
| Neighbor BS trigger | 4 | variable | The Neighbor BS trigger is a compound TLV value that indicates the trigger being applied to this neighbor BS (Table 358a). The Neighbor BS trigger is included in MOB_NBR-ADV message, only if it is different from Trigger that is defined for the neighbor BS in DCD message or from the Neighbor BS trigger for the preceding neighbor BS. |

The neighbor BS trigger TLV (type 4) in Table 348e is encoded using the description in Table 348f.

TABLE 348f

Neighbor BS Trigger TLV description

| Name | Type | Length (1 byte) | Value |
|---|---|---|---|
| Type/function/action | 4.1 | 1 | See Table 348g for description. |
| Trigger value | 4.2 | 1 | Trigger value is the value used in comparing measured metric for determining a trigger condition. |
| Trigger averaging duration | 4.3 | 1 | Trigger averaging duration is the time in ms over which the metric measurements are averaged. When the mean value of the measurement meets the trigger condition, the MS reacts using the specified action. |

The Type/function/action byte field of the Neighbor BS Trigger TLV in Table 348f is described in Table 348g.

TABLE 348g

Neighbor BS Trigger; Type/Function/Action

| Name | Length (1 byte) | Value |
|---|---|---|
| Type | 2 bits (MSB) | Trigger metric type: 0x0: CINR metric |

TABLE 348g-continued

Neighbor BS Trigger; Type/Function/Action

| Name | Length (1 byte) | Value |
|---|---|---|
| | | 0x1: RSSI metric |
| | | 0x2: RTD metric |
| | | 0x3: Reserved |
| Function | 3 bits | Computation defining trigger condition: |
| | | 0x0: Reserved |
| | | 0x1: Metric of neighbor BS is greater than absolute value |
| | | 0x2: Metric of neighbor BS is less than absolute value |
| | | 0x3: Metric of neighbor BS is greater than serving BS metric by relative value |
| | | 0x4: Metric of neighbor BS is less than serving BS metric by relative value |
| | | 0x5-0x7: Reserved |
| Action | 3 bits (LSB) | Action performed upon reaching trigger condition: |
| | | 0x0: Reserved |
| | | 0x1: Respond on trigger with MOB_SCN-REP |
| | | 0x2: Respond on trigger with MOB_MSHO-REQ |
| | | 0x3-0x7: Reserved |

The "DCD_settings" of Table 348e illustrates that DCD is a part of the MOB-NBR-ADV encodings.

Table 5 shows a modified Table 348f. The rows of "Signal_Type/function/action" and "Cell Load—Type/function/action" show the difference compared to original Table 348f in IEEE Standards 802.16-2005.

TABLE 5

Modified Table 348f-Neighbor BS Trigger TLV description

| Name | Type | Length (1 byte) | Value |
|---|---|---|---|
| Signal-Type/function/action | 4.1 | 1 | See Table 348g for description. |
| Cell Load - Type/function/action | 4.4 | 1 | See Table 348g-2 for description. |
| Trigger value | 4.2 | 1 | Trigger value is the value used in comparing measured metric for determining a trigger condition. |
| Trigger averaging duration | 4.3 | 1 | Trigger averaging duration is the time in ms over which the metric measurements are averaged. When the mean value of the measurement meets the trigger condition, the MS reacts using the specified action. |

The field of "Cell Load Type/function/action" byte of the Neighboring BS trigger type/length/value (TLV) in Table 5 is described in Table 6. The field of "Signal Type/function/action" byte of the Neighboring BS trigger TLV in Table 5 is described in original Table 348f. The difference between Table 348g and Table 6 is that the row of "Function" in Table 6 has an additional value "0x0" for cell-load ratio. Table 6 may be indicated as Table 348g-2 in IEEE Standards 802.16-2005.

TABLE 6

Neighbor BS Trigger; Type/Function/Action based on Cell-Load Ratio

| Name | Length (1 byte) | Value |
|---|---|---|
| Type | 2 bits (MSB) | Trigger metric type: 0x0: Cell-Load Ratio 0x1-0x3: Reserved |

TABLE 6-continued

Neighbor BS Trigger; Type/Function/Action based on Cell-Load Ratio

| Name | Length (1 byte) | Value |
|---|---|---|
| Function | 4 bits | Computation defining trigger condition:<br>0x0: Reserved<br>0x1: Metric of neighbor BS is greater than absolute value<br>0x2: Metric of neighbor BS is less than absolute value<br>0x3: Metric of neighbor BS is greater than serving BS metric by relative value<br>0x4: Metric of neighbor BS is less than serving BS metric by relative value<br>0x5-0x7: Reserved |
| Action | 3 bits (LSB) | Action performed upon reaching trigger condition:<br>0x0: Reserved<br>0x1: Respond on trigger with MOB_SCN-REP<br>0x2: Respond on trigger with MOB_MSHO-REQ<br>0x3-0x7: Reserved |

According to IEEE Standards 802.16-2005 Section 6.3.2.3.52 (titled as "BS HO Request (MOB_BSHO-REQ) message"), the BS may transmit a MOB_BSHO-REQ message when the BS wants to initiate a handover. An MS receiving this MOB_BSHO-REQ message may scan recommended neighbor BSs in the MOB_BSHO-REQ message. Table 109l of IEEE Standards 802.16-2005 describes the format of MOB_BSHO-REQ message.

According to IEEE Standards 802.16-2005 Section 6.3.2.3.53 (titled as "MS HO Request (MOB_MSHO-REQ) message"), the MS may transmit an MOB_MSHO-REQ message when the BS wants to initiate a handover. The message shall be transmitted on the basic CID (as shown in Table 109m).

According to IEEE Standards 802.16-2005 Section 6.3.2.3.54 (titled as "BS HO Response (MOB_BSHO-RSP) message"), the BS shall transmit an MOB_BSHO-RSP message upon reception of MOB_MSHO-REQ message. The message shall be transmitted on the basic CID (as shown in Table 109n).

Proper modifications to IEEE Standards 802.16-2005 may be made to Tables 109l, 109m and 109n. These modifications to message formats of MOB_BSHO-REQ, MOB_MSHO-REQ and MOB_BSHO-RSP are respectively shown in Tables 7 through 9. The rows of "Cell_Load Ratio" in Tables 7 through 9 are the additions to Tables 109l, 109m and 109n respectively.

TABLE 7

Addition to Table 109l-MOB_BSHO-REQ message format

| Syntax | Size | Notes |
|---|---|---|
| ... | | |
| If(Mode ==0b000){ | | |
| ... | | |
| For(j=0; j<N_Recommended; j++){ | | |
| ... | | |
| Service level prediction | 3 bits | |
| Cell_Load_Ratio | 3 bits | 000 < 30%<br>001 < 40%<br>010 < 50%<br>011 < 60%<br>100 < 70%<br>101 < 80%<br>110 < 90%<br>111 Reserved |
| ... | | |

TABLE 8

Addition to Table 109m-MOB_MSHO-REQ message format

| Syntax | Size | Notes |
|---|---|---|
| ... | | |
| For(j=0; j<N_New_BS_Index; j++){ | | |
| ... | | |
| Service level prediction | 3 bits | |
| Cell_Load_Ratio | 3 bits | 000 < 30%<br>001 < 40%<br>010 < 50%<br>011 < 60%<br>100 < 70%<br>101 < 80%<br>110 < 90%<br>111 Reserved |
| ... | | |

TABLE 9

Addition to Table 109n-MOB_BSHO-RSP message format

| Syntax | Size | Notes |
|---|---|---|
| ... | | |
| If(Mode ==0b000){ | | |
| ... | | |
| For(j=0; j<N_Recommended; j++){ | | |
| ... | | |
| Cell_Load_Ratio | 3 bits | 000 < 30%<br>001 < 40%<br>010 < 50%<br>011 < 60%<br>100 < 70%<br>101 < 80%<br>110 < 90%<br>111 Reserved |
| ... | | |

Intelligent Cell Selection

Based on the proposed calculation and broadcast of Cell-Load Ratio information as discussed above, a method is introduced for a subscriber (SS), whether fixed or mobile, to perform the network selection and the intelligent handoff for a better quality of service (QoS) compared to the prior art.

In the prior art, a subscriber is allowed to select a BS or handoff to a BS merely in dependence upon the signal strength from the neighboring cells. In the present invention, however, the subscriber is requested to consider not only the signal strength of the neighboring cells but also the cell-load ratio of the neighboring cells, and thus selecting a BS with both of a good signal strength and a lower traffic in order to obtain a better QoS and a lower system-wide outage rate.

In the prior art, when a subscriber is powered on, the subscriber searches for BSs and tries to associate with a BS with a better signal strength. In the present invention, when a subscriber is powered on (i.e., the case of Initial Cell Selection), the subscriber should compare the cell-load ratio of the neighboring BSs, select and try to associate with the BS with a lower cell-load ratio and a better signal strength according to the subscriber.

In the prior art, when a subscriber is being in service provided by a BS, the subscriber also monitors the neighboring BSs and tries to initiate handoff request when there occurs essential relative signal difference between the instant BS and the neighboring BSs. In the present invention, when a subscriber is being in service provided by a BS (i.e., the case of Subscriber-Initiated Handoff), the subscriber should monitor both of the cell-load ratios and the signal strength of the neighboring BSs and compare them to those of the instant BS, select and try to handover to a BS having a lower cell-load ratio and a better signal strength according to the subscriber.

Initial Cell Selection

Figure 1:
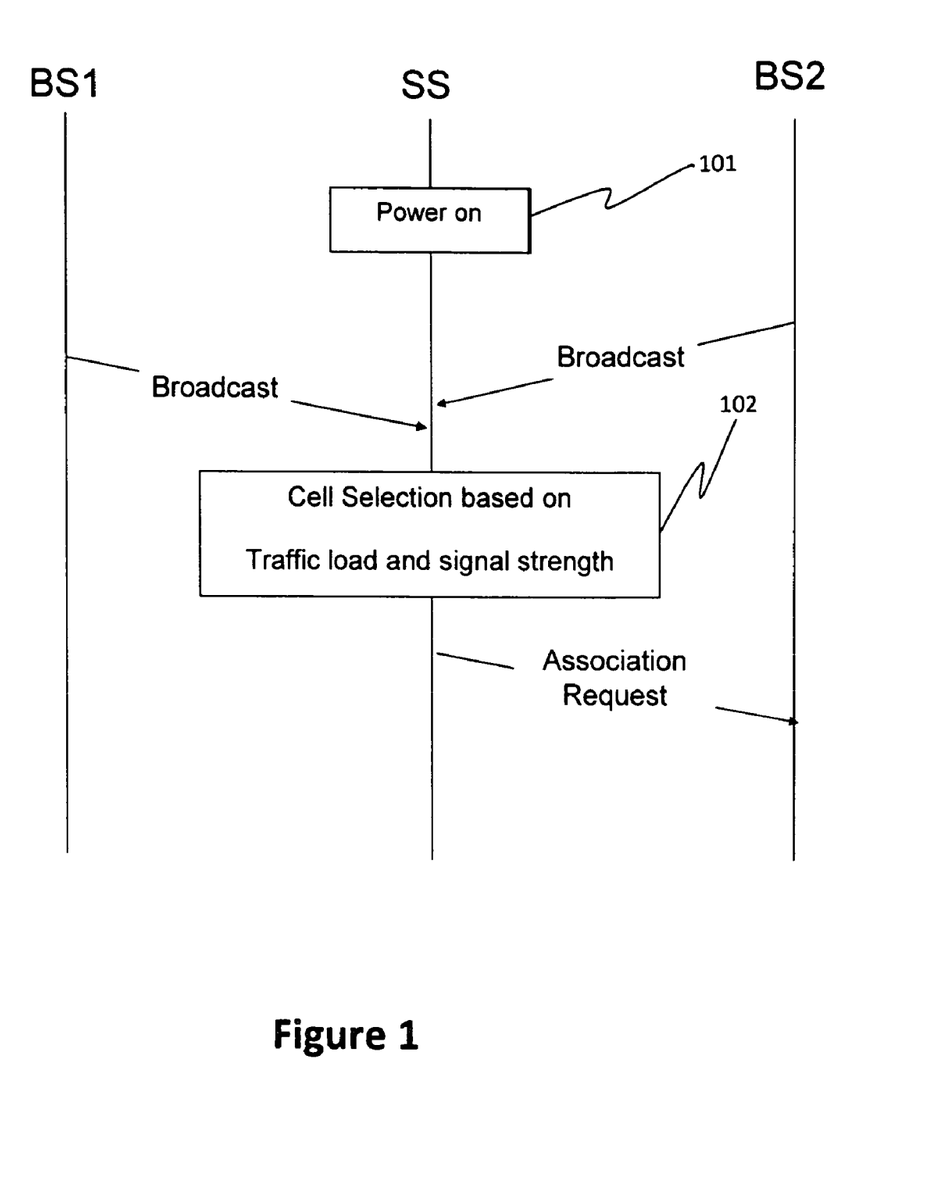
FIG. 1 is a diagram illustrating procedural steps of a cell selection of a subscriber when the subscriber is powered on according to an embodiment of the present invention.

FIG. 1 is a diagram showing the procedural steps of a cell selection of a subscriber when the subscriber is powered on. In step 101, the subscriber (SS) is powered on. The subscriber (SS) then searches for BSs over different spectrums. Subscriber (SS) receives the broadcast DCD messages and the signal strength transmitted from BS1 and BS2. Then, the subscriber (SS) extracts the cell-load ratio information from the received DCD messages, as well as calculates the signal strength provided by the neighboring BSs (e.g., BS1 and BS2). In step 102, the subscriber (SS) selects a BS with a lower cell-load ratio and a better signal strength, and sends an associate request to the selected BS (e.g., BS2). The subsequent network association and registration are same as the contemporary methods.

The present invention suggests that a subscriber may classify BSs into three groups for the purpose of initial cell selection:

Unusable group: signal is too weak for decoding BS messages.

Candidate group: signal is strong enough, but cell is already highly loaded

Desired group: signal is strong enough, and cell is lightly loaded.

Table 10 is an example of grouping the neighboring BSs by the subscriber having six neighboring BSs. BS1 has a signal strength greater than threshold T1 and a cell-load ratio is greater than threshold T2, and BS1 is classified into the candidate group; BS2 has a signal strength greater than threshold T1 and a cell-load ratio is greater than threshold T2, and BS2 is classified into the candidate group; BS3 has a signal strength less than threshold T1 and a cell-load ratio is not available, and BS3 is classified into the unusable group; BS4 has a signal strength greater than threshold T1 and a cell-load ratio is less than threshold T2, and BS4 is classified into the desired group; BS5 has a signal strength greater than threshold T1 and a cell-load ratio is less than threshold T2, and BS5 is classified into the desired group; and BS6 has a signal strength less than threshold T1 and a cell-load ratio is not available, and BS6 is classified into the unusable group.

TABLE 10

Classification of neighbor BSs at a SS

| BS # | Signal Strength | Cell-Load Ratio | Classification |
|---|---|---|---|
| BS1 | >T1 | >T2 | Candidate |
| BS2 | >T1 | >T2 | Candidate |
| BS3 | <T1 | N/A | Unusable |
| BS4 | >T1 | <T2 | Desired |
| BS5 | >T1 | <T2 | Desired |
| BS6 | <T1 | N/A | Unusable |

Threshold T1 of the BS signal and threshold T2 of the cell-load ratio are defined in Table 11.

TABLE 11

General parameter setting for initial cell selection

| Entity | Name | Time reference | Value |
|---|---|---|---|
| SS | Threshold of BS Signal (T1) | Defined relative to the metric of BS signal, e.g., RSS (receive signal strength), or SNR | |
| SS | Threshold of BS Cell-Load Ratio (T2) | Percentage of the cell capacity. | 60% (e.g.) |

Another set of thresholds T1' and T2' are defined in Table 12. Threshold T1' is the threshold of the cell-load ratio of the instant BS for triggering the evaluating of the neighboring BSs for the handover, and threshold T2' is the threshold of the difference of the cell-load ratio between the instant BS and a neighboring BS for triggering the handover.

TABLE 12

General parameter setting for initial cell selection

| Entity | Name | Time reference | Minimum value | Default value | Maximum value |
|---|---|---|---|---|---|
| SS | T1' | Threshold of Cell-Load Ratio for triggering the evaluating of neighbor BSs | | 75% | |
| SS | T2' | Threshold of the difference of Cell-Load Ratio for triggering handover to a neighbor BS with lower Cell-Load Ratio. | | 15% | |

Suggested Changes for IEEE Standards 802.16-2005 for the Initial Cell Selection

Figure 2:
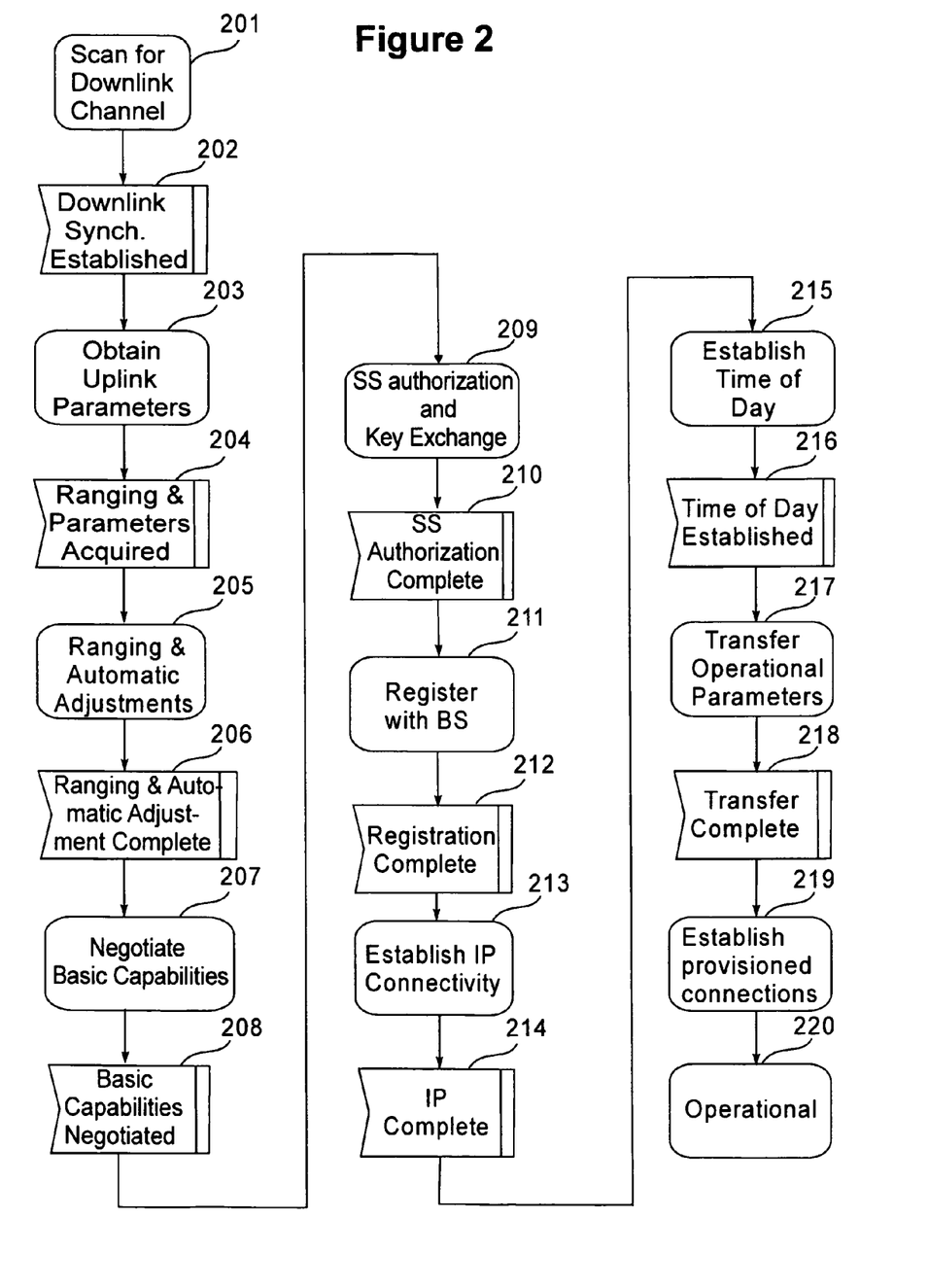
FIG. 2 is a flowchart illustrating contemporary procedural steps of network entry and initialization.

FIG. 2 is a flowchart illustrating a procedure of network entry and initialization, and is identical to FIG. 55 of IEEE Standards 802.16-2005. As described in Section 6.3.9 (titled as "Network entry and initialization") of IEEE Standards 802.16-2005, the procedure of network entry and initialization may be divided into the following phases:

a) Scan for downlink channel (step 201) and establish synchronization with the BS (step 202);

b) Obtain transmit parameters (from UCD message) (steps 203 and 204);

c) Perform ranging and automatic adjustments (steps 205 and 206);

d) Negotiate basic capabilities (steps 207 and 208);

e) Authorize SS and perform key exchange (steps 209 and 210);

f) Perform registration (steps 211 and 212);

g) Establish IP connectivity (steps 213 and 214);

h) Establish time of day (steps 215 and 216);

i) Transfer operational parameters (steps 217 and 218); and j) Set up connections (step 219).

After steps 201 through 219 are completed, the network enters an operational stage 220.

Here, a proper change is suggested to be made in Section 6.3.9.2 (titled as "Obtain downlink parameters") of IEEE Standards 802.16-2005 in order to incorporate the employment of the cell-load ratio information during the cell selection. The following statement is amended section 6.3.9.2 of IEEE Standards 802.16-2005 with the proposed amendment being underlined:

"The MAC shall search for the DL-MAP MAC management messages. The SS achieves MAC synchronization once it has received at least one DL-MAP message and is able to decode the DL-Burst Profiles contained therein. An SS MAC remains in synchronization as long as it continues to successfully receive the DL-MAP and DCD messages for its channel. If the Lost DL-MAP Interval (Table 342) has elapsed without a valid DL-MAP message or the T1 interval (Table 342) has elapsed without a valid DCD message, an SS shall try to reestablish synchronization. In addition, if the Cell-Load Ratio value in the DCD message is larger than a certain threshold, the SS shall scan for another downlink channel. The process of acquiring synchronization is illustrated in FIG. 56. The process of maintaining synchronization is illustrated in FIG. 57."

Figure 3A:
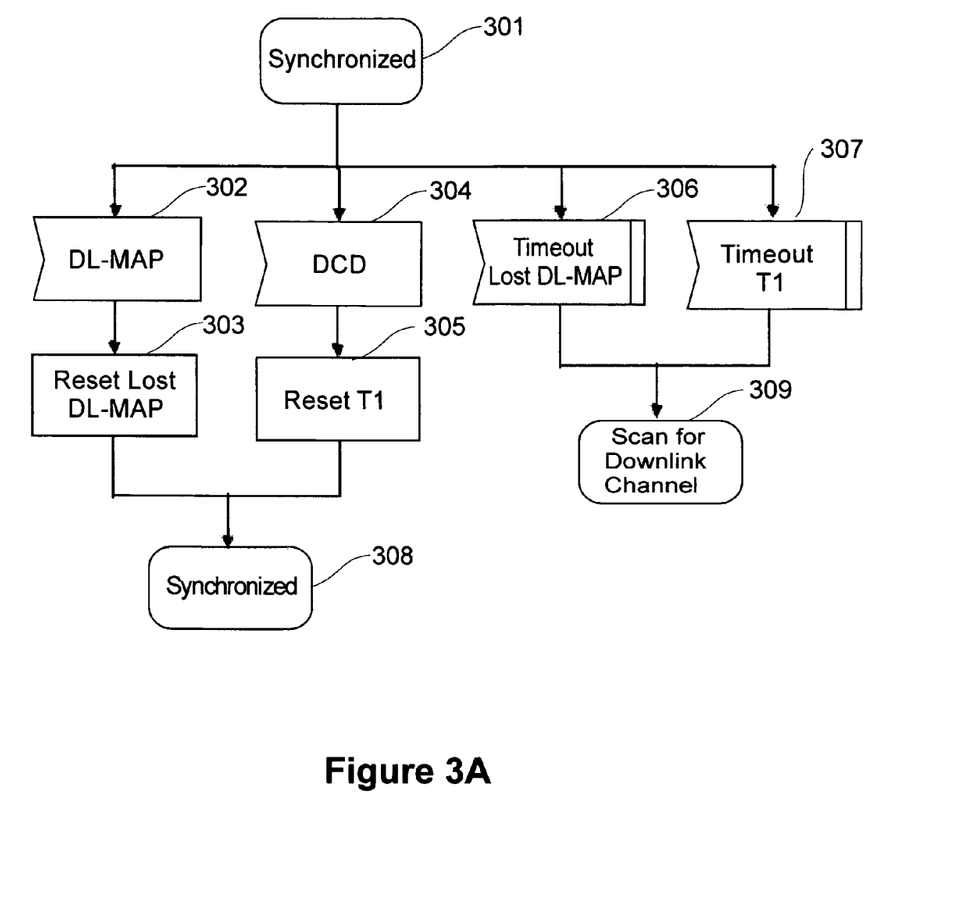
FIG. 3A is a flowchart illustrating contemporary procedural steps of the maintenance of downlink synchronization.
Figure 3B:
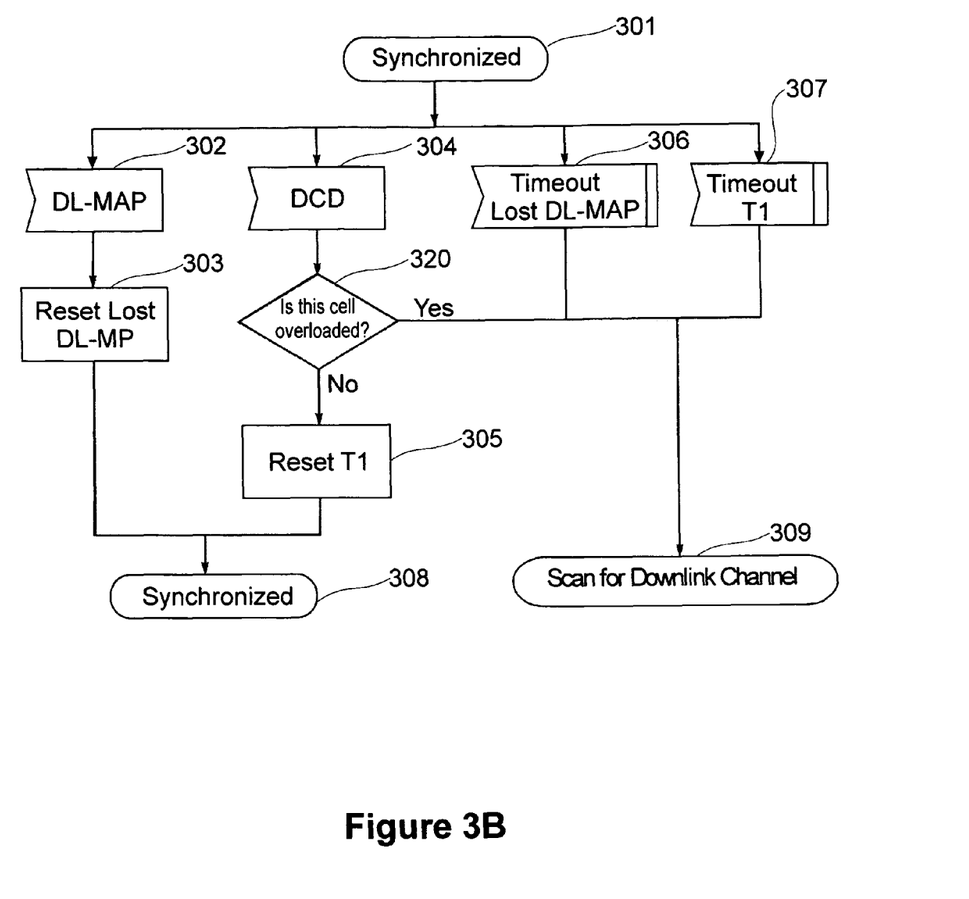
FIG. 3B is a flowchart illustrating procedural steps of the maintenance of downlink synchronization according to an embodiment of the present invention.

Here, another proper change is to amend FIG. 3A (i.e., the original FIG. 57 of IEEE Standards 802.16-2005) to FIG. 3B (i.e., the proposed amended FIG. 57 of IEEE Standards 802.16-2005) in order to incorporate the employment of the cell-load ratio information during the cell selection and be consistent with the proposed amendment to Section 6.3.9.2 of IEEE Standards 802.16-2005.

In FIG. 3A, a contemporary process of the maintenance of downlink synchronization is shown. The SS achieves MAC synchronization (step 301) once the SS has received at least one DL-MAP message, and is able to decode the DL-Burst Profiles contained therein. An SS MAC remains in synchronization (step 308) as long as it continues to successfully receive the DL-MAP (steps 302 and 303) and DCD messages for its channel (steps 304 and 305). If the Lost DL-MAP Interval has elapsed without a valid DL-MAP message (step 306) or the T1 interval has elapsed without a valid DCD message (step 307), an SS shall try to reestablish synchronization (step 309).

In FIG. 3B, steps 301 through 309 are same as shown in FIG. 3A. An additional step 320 is introduced. In step 320, "if the Cell-Load Ratio value in the DCD message is larger than a certain threshold, the SS shall scan for another downlink channel (step 309)"; if the cell-load ratio value is less or equal to the certain threshold, the SS reset T1 (step 305).

Subscriber-Initiated Handoff

Figure 4:
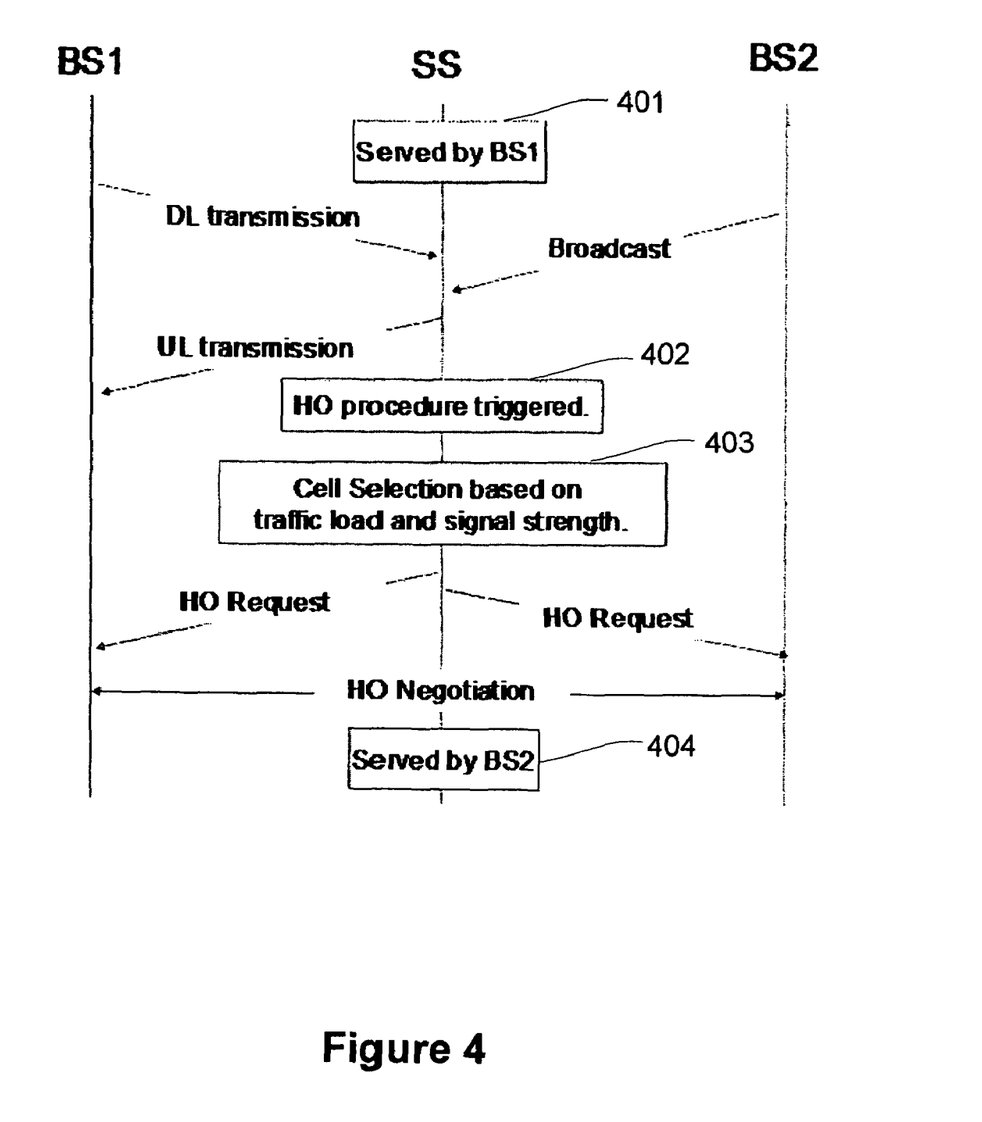
FIG. 4 is a diagram illustrating a handover procedure of the subscriber between different base stations according to an embodiment of the present invention.

FIG. 4 is a diagram showing the handover of the SS between different BSs according to the technique disclosed in the present invention. When the subscriber SS is having normal uplink and downlink data reception and transmission with the associated BS1 at stage 401, subscriber SS continuously monitors the cell-load ratio and signal strength broadcasted from the neighboring BSs, e.g., BS2. In step 402, subscriber SS may be triggered to initiate the handover by several reasons. For example, when the cell-load ratio in the primary cell is above a certain threshold (e.g., 70% of cell capacity), subscriber SS should try to handover to another BS having a cell-load ratio below a certain threshold (e.g., 60% of cell capacity). Here, the targeted BS should also have good signal strength and contemporary signal-strength thresholds may be applied. The handover may also be triggered by deteriorating signal strength as in contemporary scenario. In step 403, the selected BS should have a proper cell-load ratio, as well as good signal strength. After BS2 is selected, handover requests are sent by subscriber SS to both the primary base station BS1 and the target base station BS2. A handover negotiation is then performed. In step 404, handover is completed, subscriber SS is handed over to base station BS2 and is served by base station BS2. Here, this scenario may avoid unnecessary call interruption when a subscriber SS tries to handoff to a BS already fully loaded.

Figure 5:
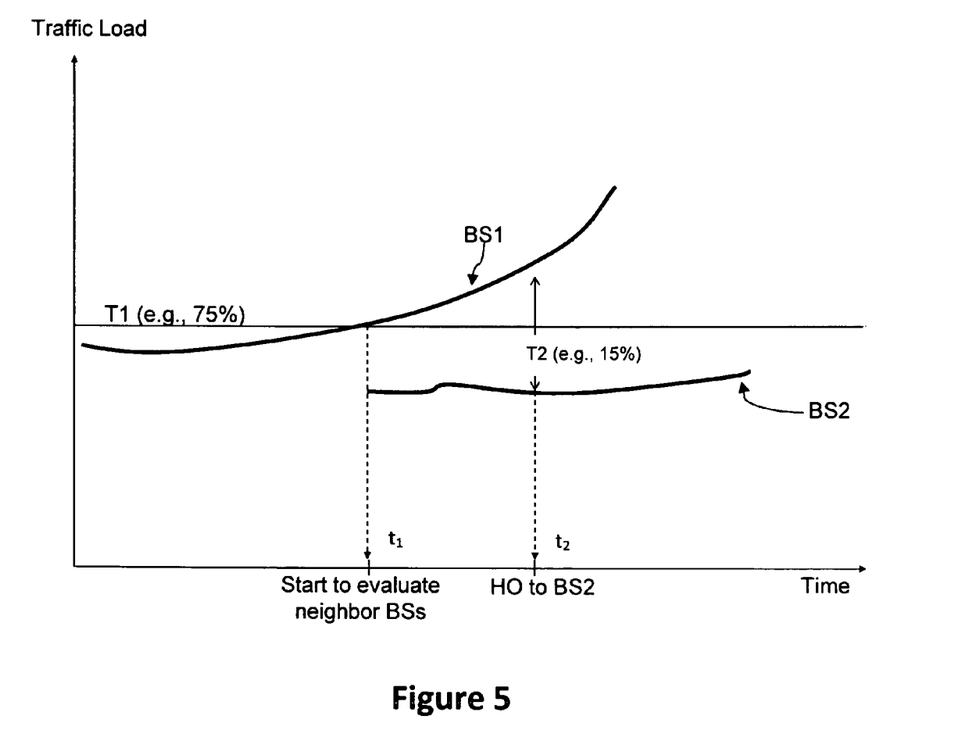
FIG. 5 is a two dimensional graph illustrating an example of the handover procedure based on the value of cell-load ratio according to an embodiment of the present invention.

While there may be numerous handover (HO) procedures related to signal strength, FIG. 5 is a two dimensional graph illustrating the HO procedure related to value of cell-load ratio. An example of threshold T1' and T2' are defined in Table 12. The cell-load ratio of base station BS1 increases when time lapses. At time $t_1$ when the cell-load ratio of BS1 reaches threshold T1' (e.g., 75% as defined in Table 12), subscriber SS starts evaluating the neighboring BSs. At time $t_2$, the difference of cell-load ratio between base stations BS1 and BS2 reaches threshold T2 (e.g., 15% as defined in Table 12). When the BS2 has a good signal strength to subscriber SS at time $t_2$, subscriber SS perform handover and starts to be served by BS2.

Note that, similar to the initial network selection, either signal deteriorating or severe cell-load ratio may trigger the handover procedure for starting evaluating the neighboring BSs. The desired targeted BS should have lighter cell-load ratio, as well as good signal strength. In some rare cases, SS may have to handoff to a BS with strong signal though already heavily loaded. In the present invention, however, every subscriber should try to find the targeted BS with lighter Cell-Load Ratio and thus a system-wide load balancing may be achieved.

Advantages of the Present Invention

The present invention may be implanted to the contemporary scenarios of cell selection and subscriber-initiated handover which are based only on signal strength. The present invention includes more advanced features, e.g., a subscriber may have different sets of network-selection thresholds to satisfy different applications. A subscriber used in the application of two-way video transmission may want to select a BS with lower cell-load ratio that a subscriber with VoIP applications does.

The advantages of adding the consideration of Cell-Load Ratio, as suggested in the present invention, are multifold.

Firstly, a cell with lower cell-load ratio means that more data transmission opportunities may be timely scheduled, and thus higher individual throughput, shorter delay and jitter, lower call-drop rate may be obtained. This is essential for subscribers used in time-sensitive applications. In other words, the present invention becomes more and more important because multimedia will dominate the future wireless traffic.

Secondly, the intelligence of cell selection and handoff from the subscriber side may benefit the BS and other subscribers. More and more subscribers may perform the cell selection and handover to BSs having lower cell-load ratio, therefore, the BSs may be relieved from the task of load balancing.

What is claimed is:

1. A method for data transmission, the method comprising the steps of:

calculating, at a base station, a cell-load ratio by:

$$r_{cl,n} = (1-\alpha) \cdot r_{cl,n-1} + \frac{d_n}{S_n},$$

where $r_{cl,n-1}$ is a cell-load ratio calculated in a previous stage, $r_{cl,n}$ is an instant cell-load ratio, $\alpha$ is a forgetting factor, $d_n$ is an instantaneous cell load, and $S_n$ is a frame capacity; and broadcasting, at the base station, the calculated cell-load ratio by carrying the cell-load ratio in a designated message.

2. The method of claim 1, with $\alpha$ being the reciprocal of an equivalent averaging period in a number of orthogonal frequency-division multiplexing (OFDM) frames for an exponential smoothing filter.

3. The method of claim 1, with $\alpha$ being the reciprocal of an equivalent averaging period in a number of transmission time intervals (TTIs) for the long term evolution (LTE) for an exponential smoothing filter.

4. The method of claim 1, with the cell-load ratio being separately calculated for traffic in an uplink and traffic in a downlink according to the base station.

5. The method of claim 1, with the cell-load ratio being calculated for a sum of traffic in an uplink and traffic in a downlink according to the base station.

6. The method of claim 1, with the designated message being a downlink channel descriptor (DCD) message.

7. The method of claim 6, with a format of the DCD message being:

where the indicator of the three-bit cell-load ratio represents a corresponding value of the cell-load ratio.

8. The method of claim 7, in which the relationship between the indicator value of the cell-load ratio and the corresponding cell-load ratios satisfies:

| Indicator Value | Cell-Load Ratio |
| --- | --- |
| 000 | <30% |
| 001 | <40% |
| 010 | <50% |
| 011 | <60% |
| 100 | <70% |
| 101 | <80% |
| 110 | <90% |
| 111 | Reserved. |

9. The method of claim 6, in which one of encodings of the DCD message represents the cell-load ratio information and the one of encodings of the DCD message satisfies:

| Name | Type (1 byte) | Length | Value (variable length) | PHY scope |
| --- | --- | --- | --- | --- |
| Cell-Load Ratio | 61 | 1 | 0x00 < 30%<br>0x01 < 40%<br>0x02 < 50%<br>0x03 < 60%<br>0x04 < 70%<br>0x05 < 80%<br>0x06 < 90%<br>0x07-0xff Reserved. | OFDMA |

10. The method of claim 6, with the DCD being one of encodings of a MOB-NBR-ADV message (neighbor advertisement message), and a neighbor base station trigger type/length/value (TLV) of the MOB-NBR-ADV message satisfying:

| Syntax | Size | Notes |
| --- | --- | --- |
| DCD_Message_Fromat( ) { | | |
|   Management Message Type = 1 | 8 bits | |
|   Cell-Load Ratio | 3 bits | Indication of cell-load ratio (see Table 3) |
|   Reserved | 5 bits | Shall be set to zero |
|   Configuration Change Count | 8 bits | TLV specific |
|   TLV Encoded information for the overall channel | Variable | TLV specific |
|   Begin PHY Specific Section { | | See applicable PHY subclause |
|     for (I = 1; I <= n; I ++) { | | For each downlink burst profile 1 to n |
|       Downlink_Burst_Profile | | PHY specific |
|     } | | |
|   } | | |
| }, | | |

| Name | Type | Length (1 byte) | Value |
| --- | --- | --- | --- |
| Signal-Type/function/action | 4.1 | 1 | Refer Table A |
| Cell Load -Type/function/action | 4.4 | 1 | Refer Table B |
| Trigger value | 4.2 | 1 | Trigger value is the value used in comparing measured metric for determining a trigger condition. |
| Trigger averaging duration | 4.3 | 1 | Trigger averaging duration is the time in ms over which the metric measurements are averaged. When the mean value of the measurement meets the trigger condition, the MS reacts using the specified action. | where Table A is:

| Name | Length (1 byte) | Value |
| --- | --- | --- |
| Type | 2 bits (MSB) | Trigger metric type:<br>0x0: CINR metric<br>0x1: RSSI metric<br>0x2: RTD metric<br>0x3: Reserved |
| Function | 3 bits | Computation defining trigger condition:<br>0x0: Reserved<br>0x1: Metric of neighbor BS is greater than absolute value<br>0x2: Metric of neighbor BS is less than absolute value<br>0x3: Metric of neighbor BS is greater than serving BS metric by relative value<br>0x4: Metric of neighbor BS is less than serving BS metric by relative value<br>0x5-0x7: Reserved |
| Action | 3 bits (LSB) | Action performed upon reaching trigger condition:<br>0x0: Reserved<br>0x1: Respond on trigger with MOB_SCN-REP<br>0x2: Respond on trigger with MOB_MSHO-REQ<br>0x3-0x7: Reserved, | and Table B is:

| Name | Length (1 byte) | Value |
| --- | --- | --- |
| Type | 2 bits (MSB) | Trigger metric type:<br>0x0: Cell-Load Ratio<br>0x1-0x3: Reserved |
| Function | 4 bits | Computation defining trigger condition:<br>0x0: Reserved<br>0x1: Metric of neighbor BS is greater than absolute value<br>0x2: Metric of neighbor BS is less than absolute value<br>0x3: Metric of neighbor BS is greater than serving BS metric by relative value<br>0x4: Metric of neighbor BS is less than serving BS metric by relative value<br>0x5-0x7: Reserved |
| Action | 3 bits (LSB) | Action performed upon reaching trigger condition:<br>0x0: Reserved<br>0x1: Respond on trigger with MOB_SCN-REP<br>0x2: Respond on trigger with MOB_MSHO-REQ<br>0x3-0x7: Reserved. |

11. The method of claim 1, further comprising a step of:

transmitting, at the base station, a base station handover request (MOB_BSHO-REQ) message with the MOB_BSHO-REQ message comprising information representing the cell-load ratio.

12. The method of claim 11, with the MOB_BSHO-REQ message comprising contents of:

| Syntax | Size | Notes |
| --- | --- | --- |
| ... | | |
| If(Mode ==0b000){ | | |
| ... | | |
| For(j=0; j<N_Recommended; j++){ | | |
| ... | | |
| Service level prediction | 3 bits | |
| Cell_Load_Ratio | 3 bits | 000 < 30%<br>001 < 40%<br>010 < 50%<br>011 < 60%<br>100 < 70%<br>101 < 80%<br>110 < 90%<br>111 Reserved |
| .... | | |

13. The method of claim 1, further comprising:

transmitting, at the base station, a mobile station handover request (MOB_MSHO-REQ) message with the MOB_MSHO-REQ message comprising information representing the cell-load ratio.

14. The method of claim 13, with the MOB_MSHO-REQ message comprising contents of:

| Syntax | Size | Notes |
| --- | --- | --- |
| ... | | |
| For(j=0; j<N_New_BS_Index; j++){ | | |
| ... | | |
| Service level prediction | 3 bits | |
| Cell_Load_Ratio | 3 bits | 000 < 30%<br>001 < 40%<br>010 < 50%<br>011 < 60%<br>100 < 70%<br>101 < 80%<br>110 < 90%<br>111 Reserved |
| .... | | |

15. The method of claim 1, further comprising:
transmitting, at the base station, a base station handover response (MOB_BSHO-RSP) message with the MOB_BSHO-RSP message comprising information representing the cell-load ratio.

16. The method of claim 15, with the MOB_BSHO-RSP message comprising contents of:

| Syntax | Size | Notes |
|---|---|---|
| ... | | |
| If(Mode ==0b000){ | | |
| ... | | |
| For(j=0; j<N_Recommended; j++){ | | |
| ... | | |
| Cell_Load_Ratio | 3 bits | 000 < 30% |
| | | 001 < 40% |
| | | 010 < 50% |
| | | 011 < 60% |
| | | 100 < 70% |
| | | 101 < 80% |
| | | 110 < 90% |
| | | 111 Reserved |
| .... | | |

17. A method for data transmission, the method comprising the steps of:
receiving, at a subscriber, broadcasted messages including information of a cell-load ratio established by:

$$r_{cl,n} = (1-\alpha) \cdot r_{cl,n-1} + \frac{d_n}{S_n},$$

where $r_{cl,n-1}$ is a value of the cell-load ratio calculated in a previous stage, $r_{cl,n}$ is the instant cell-load ratio, $\alpha$ is a forgetting factor, $d_n$ is an instantaneous cell load, and $S_n$ is a frame capacity;
monitoring, at the subscriber, signal strength of a plurality of base stations; and
when the subscriber is powered on, selecting among the plurality of base stations, at the subscriber, a base station having the cell-load ratio lower than a first predetermined threshold and the signal strength higher than a second predetermined threshold as a serving base station for the subscriber.

18. The method of data transmission of claim 17, when the subscriber is powered on, further comprising a step of:
sending, at the subscriber, an associate message to the selected base station.

19. The method for data transmission of claim 17, with the broadcasted messages being downlink channel descriptor (DCD) messages.

20. The method for data transmission of claim 19, further comprising a step of exacting the cell-load ratio information from the received DCD messages.

21. The method for data transmission of claim 19, with the first predetermined threshold being 60%.

22. The method of data transmission of claim 17, when the subscriber is being in service by a designated base station, further comprising the steps of:
when the cell-load ratio of the designated base station is greater than a third predetermined threshold and a difference of the cell-load ratio between the designate base station and at least one of neighboring base stations is equal to or greater than a fourth predetermined threshold, with the at least one of neighboring base stations having the signal strength higher than the second predetermined threshold, triggering, at the subscriber, an initiation of a handover; and
selecting among the plurality of base stations, at the subscriber, the at least one of neighboring base stations as the serving base station for the subscriber.

23. The method of data transmission of claim 22, when the subscriber is being in service by a designated base station, further comprising the steps of:
respectively sending, at the subscriber, handover requests to the designated base station and to the selected serving base station; and
performing handover negotiation between the designated base station and the selected serving base station.

24. The method of data transmission of claim 22, with the third threshold being 75%.

25. The method of data transmission of claim 22, with the fourth predetermined threshold being 15%.

26. The method of data transmission of claim 17, further comprising a step of:
classifying, at the subscriber, the plurality of base stations into three groups and the three groups being:
a first group including base stations providing signal strength lower than the first predetermined threshold,
a second group including base stations providing signal strength higher than the first predetermined threshold and cell-load ratio higher than the predetermined second threshold, and
a third group including base stations providing signal strength higher than the first predetermined threshold and cell-load ratio lower than the second predetermined threshold.

27. A method for data transmission, the method comprising the steps of:
receiving, at a subscriber being in service by a designated base station, broadcasted messages including information of a cell-load ratio established by:

$$r_{cl,n} = (1-\alpha) \cdot r_{cl,n-1} + \frac{d_n}{S_n},$$

where $r_{cl,n-1}$ is a value of the cell-load ratio calculated in a previous stage, $r_{cl,n}$ is the instant cell-load ratio, $\alpha$ is a forgetting factor, $d_n$ is an instantaneous cell load, and $S_n$ is a frame capacity;
monitoring, at the subscriber, signal strength of a plurality of base stations;
when the cell-load ratio of the designated base station is greater than a third predetermined threshold and a difference of the cell-load ratio between the designate base station and at least one of neighboring base stations is equal to or greater than a fourth predetermined threshold, with the at least one of neighboring base stations having the signal strength higher than the second predetermined threshold, triggering, at the subscriber, an initiation of a handover; and
selecting among the plurality of base stations, at the subscriber, the at least one of neighboring base stations as the serving base station for the subscriber.

28. The method of data transmission of claim 27, further comprising the steps of:
respectively sending, at the subscriber, handover requests to the designated base station and to the selected serving base station; and performing handover negotiation between the designated base station and the selected serving base station.

29. The method of data transmission of claim 27, with the third threshold being 75%.

30. The method of data transmission of claim 27, with the fourth predetermined threshold being 15%.

31. An apparatus, comprising:
a calculator calculating a cell-load ratio by:

$$r_{cl,n} = (1-\alpha) \cdot r_{cl,n-1} + \frac{d_n}{S_n},$$

where $r_{cl,n-1}$ is a cell-load ratio calculated in a previous stage, $r_{cl,n}$ is an instant cell-load ratio, $\alpha$ is a forgetting factor, $d_n$ is an instantaneous cell load, and $S_n$ is a frame capacity; and
antennas broadcasting the calculated cell-load ratio by carrying the cell-load ratio in a designated message.

32. The apparatus of claim 31, with the designated message being a downlink channel descriptor (DCD) message.

33. An apparatus, comprising:
antennas receiving broadcasted messages including information of a cell-load ratio established by:

$$r_{cl,n} = (1-\alpha) \cdot r_{cl,n-1} + \frac{d_n}{S_n},$$

where $r_{cl,n-1}$ is a value of the cell-load ratio calculated in a previous stage, $r_{cl,n}$ is an instant cell-load ratio, $\alpha$ is a forgetting factor, $d_n$ is an instantaneous cell load, and $S_n$ is a frame capacity; and receiving signal strength of a plurality of base stations; and
a processor, when the apparatus is powered on, selecting among the plurality of base stations a base station having the cell-load ratio lower than a first predetermined threshold and the signal strength higher than a second predetermined threshold as a serving base station for the apparatus; and when the cell-load ratio of the designated base station is greater than a third predetermined threshold and a difference of the cell-load ratio between the designate base station and at least one of neighboring base stations is equal to or greater than a fourth predetermined threshold, with the at least one of neighboring base stations having the signal strength higher than the second predetermined threshold, triggering an initiation of a handover, and selecting among the plurality of base stations, at the apparatus, the at least one of neighboring base stations as the serving base station for the subscriber.

34. The apparatus of claim 33, with the broadcasted messages being a downlink channel descriptor (DCD) message.

* * * * *